(12) United States Patent
Luvö

(10) Patent No.: US 12,277,558 B2
(45) Date of Patent: Apr. 15, 2025

(54) SUBSCRIPTION-BASED ACTIVATION OF ADS FEATURES

(71) Applicant: Zenseact AB, Gothenburg (SE)

(72) Inventor: Thomas Luvö, Stenkullen (SE)

(73) Assignee: Zenseact AB, Gothenburg (SE)

( * ) Notice: Subject to any disclaimer, the term of this patent is extended or adjusted under 35 U.S.C. 154(b) by 332 days.

(21) Appl. No.: 17/960,188

(22) Filed: Oct. 5, 2022

(65) Prior Publication Data

US 2023/0110969 A1 Apr. 13, 2023

(30) Foreign Application Priority Data

Oct. 11, 2021 (EP) .................................... 21201973

(51) Int. Cl.
| | |
|---|---|
| *G06Q 20/38* | (2012.01) |
| *B60W 50/06* | (2006.01) |
| *B60W 60/00* | (2020.01) |
| *G06Q 20/10* | (2012.01) |
| *G06Q 20/22* | (2012.01) |

(52) U.S. Cl.
CPC ........... *G06Q 20/389* (2013.01); *B60W 50/06* (2013.01); *B60W 60/001* (2020.02); *G06Q 20/10* (2013.01); *G06Q 20/223* (2013.01)

(58) Field of Classification Search
CPC .... G06Q 20/389; G06Q 20/10; G06Q 20/223; B60W 50/06; B60W 60/001
See application file for complete search history.

(56) References Cited

U.S. PATENT DOCUMENTS

| | | | |
|---|---|---|---|
| 10,713,727 B1 * | 7/2020 | Floyd | G06Q 40/08 |
| 10,832,338 B1 * | 11/2020 | Floyd | G07C 5/02 |
| 2019/0109713 A1 * | 4/2019 | Clark | G06F 16/182 |
| 2020/0090203 A1 | 3/2020 | Reichenbach et al. | |
| 2020/0134612 A1 * | 4/2020 | Fostiropulo | G06Q 20/322 |

(Continued)

FOREIGN PATENT DOCUMENTS

EP 3525498 A1 8/2019

OTHER PUBLICATIONS

EPO Communication with European Search Report dated Apr. 5, 2022 for Patent Application No. 21201973.1, consisting of 7—pages.

(Continued)

*Primary Examiner* — Edwin A Young
(74) *Attorney, Agent, or Firm* — Weisberg I.P. Law. P.A.

(57) ABSTRACT

A method performed by a distributed subscription-handling system for supporting subscription-based activation of Automated Driving System (ADS) features in a vehicle. Arrangements that support a process where complexity and/or the transaction cost of ADS feature subscription handling may be limited. There is identified at one or more ADS-equipped vehicles connected via a peer-to-peer blockchain network having at least a first service provider node dedicated to an ADS feature provider, data indicative of one or more subscription options comprising indication of various ADS feature sets available for activation and indication of respective corresponding required ADS-related vehicle configuration are defined in at least a first blockchain-stored smart contract deployed by the at least first service provider node.

20 Claims, 3 Drawing Sheets

(56) References Cited

U.S. PATENT DOCUMENTS

2020/0288288 A1* 9/2020 Lee .................. H04W 4/46
2021/0056544 A1* 2/2021 Mitra ................ G06Q 20/308

OTHER PUBLICATIONS

Benjamin Leiding et al.; Enabling the Vehicle Economy Using a Blockchain-Based Value Transaction Layer Protocol for Vehicular Ad-Hoc Networks; Chorus Mobility, Research paper—Version 1.3.0, Mar. 31, 2019, consisting of 28—pages.
Mirko Zichichi et al.; A Distributed Ledger Based Infrastructure for Smart Transportation System and Social Good; Arxiv.org; Oct. 8, 2019, consisting of 8—pages.
Ralph Tkatchuk; How blockchain is hastening the advance of autonomous cars; Safe Commerce, Oct. 31, 2017, consisting of 8—pages.
Tjard Schuetz Yannick et al.; The Automotive Sector and Blockchain: Is Trust what we need to enable the next Generation of Mobility Services?; A Joint Whitepaper by MHP and Riddle Sep. 1, 2019, consisting of 28—pages.
Benjamin Leiding et al.; Self-managed and Blockchain-based Vehicular Ad-hoc Networks; User Interface Software and Technology, Sep. 12, 2016, consisting of 4—pages.

* cited by examiner

SUBSCRIPTION-BASED ACTIVATION OF ADS FEATURES

CROSS REFERENCE TO RELATED APPLICATION

This Application is related to and claims priority to European Patent Application No. 21201973.1, filed Oct. 11, 2021, entitled SUBSCRIPTION-BASED ACTIVATION OF ADS FEATURES the entirety of which is incorporated herein by reference.

TECHNICAL FIELD

The present disclosure relates to supporting subscription-based activation of ADS features in a vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

One approach for ADS feature providers—such as ADS features developing companies—to provide ADS-supporting vehicles and/or its operators with ADS features for activation, may be to offer ADS features as services activated through subscriptions. Such subscriptions may for instance support different vehicle configurations and timespans, e.g. from yearly subscriptions to single weekend activations. Assuming a standard centralized solution where the ADS feature provider controls its feature subscriptions, potential occupants and/or operators of ADS-supporting vehicles—which in this context may be referred to as customers and/or end customers—need to communicate with the ADS feature provider and/or a subscription management system e.g. billing B2B company to activate a vehicle ADS feature. The ADS feature provider may then need to interact with the e.g. billing B2B company, which in turn may need to communicate with the OEM that controls the vehicle fleet. Moreover, the OEM may need to communicate with the ADS feature provider to understand the technical aspects of the activation and requirements on the vehicle configuration, and further need to identify the actual vehicle for the requested activation and validate that the vehicle supports that particular feature, taking into consideration potential vehicle updates e.g. done at services. Furthermore, the OEM may then need to relate the customer to the vehicle and further communicate with the ADS feature provider to receive the activation information. Moreover, the ADS feature provider may then bill the customer through the billing company as the OEM sends the activation information to the vehicle. Evidently, it may be a complicated process with many actors and handovers, where the identity of the customer needs to be protected and at the same time shared in order to find the vehicle identity, while fulfilling GDPR and similar regulations. Accordingly, subscription handling of ADS features involving transactions and handovers as described above implicates complexity, potentially along with significant backend and/or transaction costs.

SUMMARY OF THE INVENTION

It is therefore an object of embodiments herein to provide an approach which in an improved and/or alternative manner supports subscription-based activation—and potentially deactivation—of ADS features in a vehicle.

The object above may be achieved by the subject-matter disclosed herein. Embodiments are set forth in the appended claims, in the following description and in the drawings.

The disclosed subject-matter relates to a method performed by a distributed subscription-handling system for supporting subscription-based activation of ADS features in a vehicle. The distributed subscription-handling system identifies at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node. The distributed subscription-handling system further generates at a first vehicle of the one or more vehicles, based on selecting one of the subscription options, a subscription request transaction to be sent to the smart contract in which the selected subscription option is defined, which subscription request transaction comprises data indicative of the selected subscription option and further vehicle identity—and/or status of ADS-related vehicle configuration—of the first vehicle. Moreover, the distributed subscription-handling system adds with support from the selection-related smart contract the subscription request transaction to a blockchain of the network, when consensus of the subscription request transaction is reached on the network. Furthermore, the distributed subscription-handling system enables at the first vehicle, based on identifying that the blockchain has been updated with the subscription request transaction, activation of at least a first ADS feature corresponding to the ADS feature set of the selected subscription.

The disclosed subject-matter further relates to a distributed subscription-handling system for supporting subscription-based activation of ADS features in a vehicle. The distributed subscription-handling system comprises an options identifying unit for identifying at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node. The distributed subscription-handling system further comprises a transaction generating unit for generating at a first vehicle of the one or more vehicles, based on selecting one of the subscription options, a subscription request transaction to be sent to the smart contract in which the selected subscription option is defined, which subscription request transaction comprises data indicative of the selected subscription option and further vehicle identity—and/or status of ADS-related vehicle configuration—of the first vehicle. Moreover, the distributed subscription-handling system comprises a transaction adding unit for adding with support from the selection-related smart contract the subscription request transaction to a blockchain of the network, when consensus of the subscription request transaction is reached on the network. The distributed subscription-handling system further comprises an ADS feature enabling unit for enabling at the first vehicle, based on identifying that the blockchain has been updated with the subscription request transaction, activation of at least a first ADS feature corresponding to the ADS feature set of the selected subscription option.

Moreover, the disclosed subject-matter relates to a computer program product comprising a computer program containing computer program code means arranged to cause a computer or a processor to execute the steps of a distributed subscription-handling system described herein, stored on a computer-readable medium or a carrier wave.

The disclosed subject-matter further relates to a non-volatile computer readable storage medium having stored thereon said computer program product.

Thereby, there is introduced an approach enabling an efficient process where complexity and/or transactions cost of ADS feature subscription handling may be limited. That is, since there is identified at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node, one or many vehicles such as e.g. a vehicle fleet comprising numerous vehicles—which vehicles respectively are provided with an ADS and further are configured to communicate among one another and with one or more service provider nodes via a blockchain network and potential other nodes on the network e.g. computational nodes—are made aware, via one or more service provider enabled smart contracts on the blockchain, of one or more ADS features offered for activation—and corresponding required vehicle configurations relevant therefor such as required ADS-related sensors and/or equipment, supported ADS software versions and/or supported country registrations etc.— tied to one or different subscription alternatives. Accordingly, there is made available by means of the blockchain one or various subscription options covering one or various ADS features available for activation, offered by an ADS feature provider. In other words, with the introduced concept, customer vehicles are connected into virtual networks together with an ADS feature provider, sharing a blockchain supporting smart contracts that the customer—and/or vehicles—and ADS feature provider may interact through using these smart contracts. Furthermore, that is, since there is generated at a first vehicle of the one or more vehicles, based on selecting one of the subscription options, a subscription request transaction to be sent to the smart contract in which the selected subscription option is defined, which subscription request transaction comprises data indicative of the selected subscription option and further vehicle identity—and/or status of ADS-related vehicle configuration—of the first vehicle, at least a first vehicle produces—with support from the selection-related smart contract(s)—a blockchain transaction candidate indicative of a selected—e.g. by a potential vehicle occupant and/or customer associated with said first vehicle—subscription alternative, which further is indicative of an identity of the first vehicle—such as a vehicle identification number thereof—and/or of a ADS-relevant vehicle configuration of said first vehicle reflecting a current and/or stored status and/or setup, such as e.g. one or more of ADS-related sensors and/or equipment and further functioning status thereof, ADS software version, country registration etc. Accordingly, following at least a first of the subscription options being picked—for instance based on selection input and/or selection data derivable and/or received from e.g. a user interface such as via a therefor configured app available in said first vehicle and/or on an electronic device such as e.g. a smart phone associated with the first vehicle and/or a customer in turn associated with said first vehicle—there is generated a record comprising data reflecting the chosen subscription option along with data reflecting the first vehicle's identity—and/or status of its ADS-relevant configuration—to be added to the blockchain. Subsequently, numerous network-connected vehicles may in a similar manner generate respective subscription request transactions, indicating respective selected subscription option(s). Moreover, that is, since there is added with support from the selection-related smart contract the subscription request transaction to a blockchain of the network, when consensus of the subscription request transaction is reached on the network, the subscription request transaction is upon consensus being reached among vehicles, service provider node(s) and/or further nodes such as computational nodes on the network—for instance based on a proof-of-stake approach— logged to the blockchain, with support from the smart contract in which the selected subscription option is defined. Accordingly, provided that consensus is reached on the network for the subscription request transaction, such as by content of said transaction—e.g. at least the identity of the first vehicle and/or the status of its ADS-related configuration—by for instance a majority of network-connected vehicles and/or non-vehicle nodes, being found to comply with requirements and/or conditions stipulated in the smart contract in which the selected subscription option is defined—e.g. at least the required ADS-related vehicle configuration—then the subscription request transaction is added to the blockchain. Furthermore, that is, since there is enabled at the first vehicle, based on identifying that the blockchain has been updated with the subscription request transaction, activation of at least a first ADS feature corresponding to the ADS feature set of the selected subscription option; upon establishing that the subscription request transaction has been logged to the blockchain—and potentially further upon assessing data indicative of a therewith associated subscription status e.g. comprising indication of subscription period—the first vehicle is then allowed activating one or more ADS features complying with ADS feature(s) of the selected subscription option, for instance in accordance with conditions associated therewith such as subscription time constraints—e.g. allowed subscription period—and/or desired subscription period, and/or activation period(s). Accordingly, provided that said subscription request transaction has been added to the blockchain, it may be concluded that restrictions and/or conditions pertinent the selected subscription option are complied with and that the first vehicle subsequently is deemed eligible and/or approved for implementing the selected subscription option.

For that reason, an approach is provided for in an improved and/or alternative manner support subscription-based activation—and potentially deactivation—of ADS features in a vehicle.

In other words, with the introduced concept using a distributed mechanism based on smart contracts for handling feature subscription in vehicles, there is provided an approach which may limit and/or decrease process complexity of the backend and/or transaction costs of subscription handling, while at the same time limiting and/or decreasing number of handovers between potential different parties, such as an ADS feature provider, customer(s) and vehicle fleet OEM, and potentially further a subscription management system such as e.g. a billing B2B company. Moreover, the use of smart contracts in this context may further enable an ADS feature provider to retain control and transparency of the process such as current status and history—which otherwise would have been challenging to collect and maintain—while business and identity aspects of both the customer and of the ADS feature provider may remain protected. That is, as compared to an assumed standard centralized solution; with the introduced concept subscription and potential license handling is distributed to the vehicles, instead of subscriptions being handled centrally. This distributed approach covers not only the activation process and potential payment but also the validation of the vehicle configuration and identification, which—in addition to protecting private information between parties—significantly may decrease the number of handovers and process complexity of negotiating information between parties for activating a subscription in a customer vehicle.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
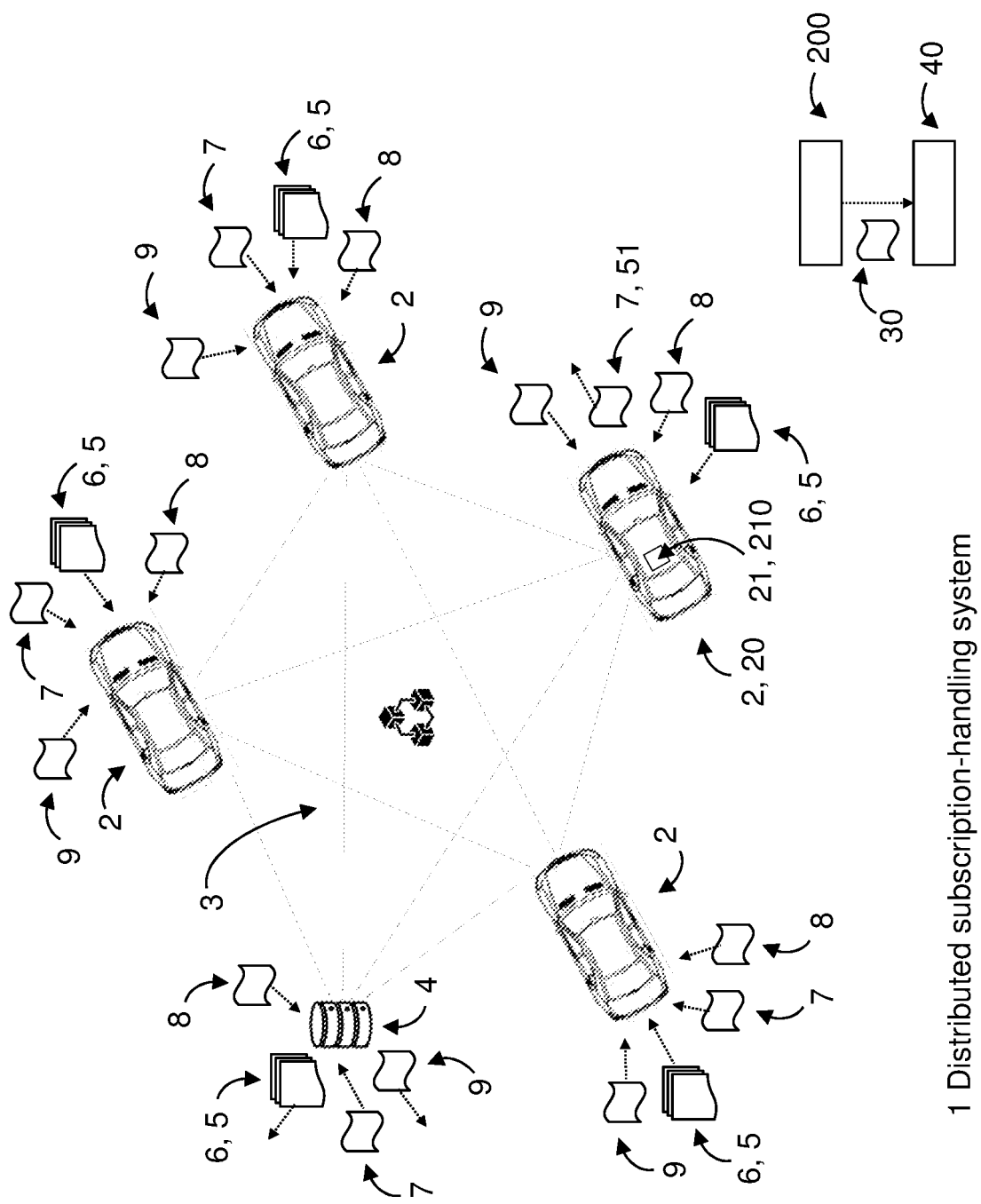
FIG. 1 illustrates a schematic view of an exemplifying distributed subscription-handling system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting subscription-based activation of ADS features in a vehicle, there will be disclosed an approach enabling an efficient process where complexity and/or transactions cost of ADS feature subscription handling may be limited.

Figure 2:
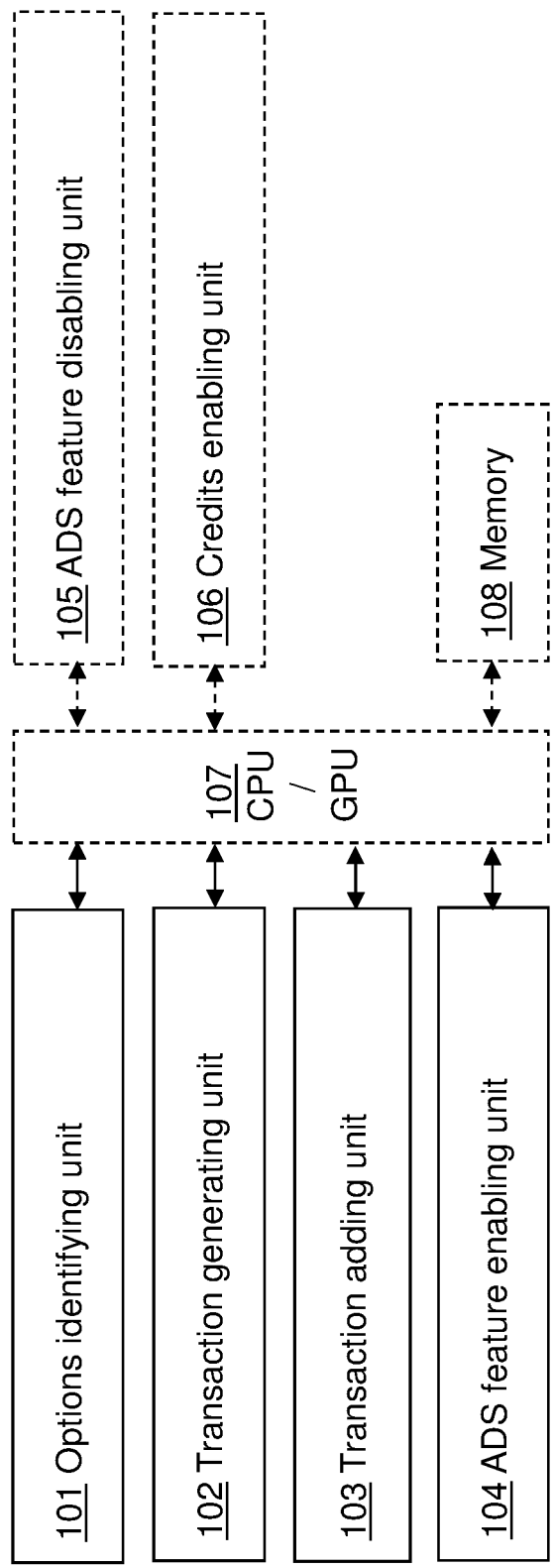
FIG. 2 is a schematic block diagram illustrating an exemplifying distributed subscription-handling system according to embodiments of the disclosure.

Referring now to the figures, there is depicted in FIG. 1 a schematic view—and in FIG. 2 a schematic block diagram—of an exemplifying distributed subscription-handling system 1 according to embodiments of the disclosure. The distributed subscription-handling system 1 is adapted for for supporting subscription-based activation and potentially deactivation of ADS features in a vehicle. An ADS feature referred to herein may be represented by any arbitrary—e.g. known— ADS feature, such as any feature controlling a vehicle's movement. According to an example, such an ADS feature may thus be represented by e.g. lane control, cruise control, parking assistance, etc. Moreover, the phrase "distributed subscription-handling system" may refer to "peer and/or node subscription-handling system", "distributed subscription-based ADS feature handling system", "distribution-based system" and/or "assessment system", whereas "method performed by a distributed subscription-handling system" may refer to "at least partly computer-implemented method performed by a distributed subscription-handling system". "For supporting subscription-based activation of ADS features", on the other hand, may refer to "for enabling and/or handling subscription-based activation of ADS features", "for supporting distributed subscription-handling of ADS features" and/or "for supporting subscription-based handling of ADS features". According to an example, the phrase "for supporting subscription-based activation of ADS features" may further throughout the disclosure refer to "for supporting subscription-based activation—and potentially deactivation—of ADS features", Moreover, "activation of ADS features in a vehicle" may refer to "activation of ADS features in at least a first vehicle and/or one or more vehicles" and/or "activation of ADS features in vehicles", and furthermore to "activation of one or more ADS features in a vehicle".

As illustrated in an exemplifying manner in exemplifying FIGS. 1 and 2, the distributed subscription-handling system 1 is—e.g. by means of an options identifying unit 101—adapted and/or configured for identifying at one or more ADS-equipped vehicles 2 connected via a peer-to-peer blockchain network 3 further comprising at least a first service provider node 4 dedicated to an ADS feature provider, data indicative of one or more subscription options 5 comprising indication of various ADS feature sets available for activation and indication of respective corresponding required ADS-related vehicle configuration, defined in at least a first blockchain-stored smart contract 6 deployed by the at least first service provider node 4. Thereby, one or many vehicles 2—such as e.g. a vehicle fleet comprising numerous vehicles 2—which vehicles 2 respectively are provided with an ADS 21 and further are configured to communicate among one another and with one or more service provider nodes 4 via a blockchain network 3 and potential other nodes on the network 3 e.g. computational nodes, are made aware—via one or more service provider enabled smart contracts 6 on the blockchain—of one or more ADS features offered for activation—and corresponding required vehicle configurations relevant therefor such as required ADS-related sensors and/or equipment, supported ADS software versions and/or supported country registrations etc.—tied to one or different subscription alternatives 5. Accordingly, there is made available by means of the blockchain one or various subscription options 5 covering one or various ADS features available for activation, offered by an ADS feature provider. In other words, with the introduced concept, customer vehicles 2 are connected into virtual networks together with an ADS feature provider, sharing a blockchain supporting smart contracts that the customer—and/or vehicles 2—and ADS feature provider may interact through using these smart contracts.

The peer-to-peer blockchain network 3—to which vehicles 2, service provider nodes 4 and/or other nodes may be added and/or removed from over time—may be represented by any arbitrary feasible peer-to-peer blockchain network, for instance known in the art, and comprise any arbitrary number of ADS-equipped vehicles 2 and similarly any arbitrary number of service provider nodes 4 as well as other nodes such as e.g. computational nodes. Moreover, the service provider node(s) 4 dedicated to an ADS feature provider may be represented by any arbitrary node(s) on the network 3—e.g. non-vehicle node(s)—associated with and/or controlled by said ADS feature provider. Respective vehicle(s) 2, on the other hand, may be represented by any arbitrary—e.g. known—manned or unmanned vehicle(s), for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle" and/or "fleet vehicle". Moreover, respective vehicle 2 is provided with an ADS 21, which ADS 21 may be represented by any arbitrary ADAS or AD system e.g. known in the art and/or yet to be developed. Moreover, respective vehicle 2 and/or ADS 21 may comprise, be provided with and/or have onboard an optional perception system (not shown) and/or similar system and/or functionality adapted to estimate surroundings of the vehicle 2, and subsequently adapted to estimate world views of the surroundings e.g. with support from a—e.g. commonly known—digital map such as a high definition, HD, map, and/or an equivalent and/or successor thereof. Such an exemplifying perception system or similar system may refer to any commonly known system and/or functionality, e.g. comprised in one or more electronic control modules, ECUs, and/or nodes of respective vehicle 2 and/or ADS 21, adapted and/or configured to interpret sensory information—relevant for driving of the vehicle 2—to identify e.g. objects, obstacles, vehicle lanes, relevant signage, appropriate navigation paths etc. The exemplifying perception system or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard respective vehicle 2 adapted to sense and/or perceive the vehicle's 2 whereabouts and/or surroundings, for instance represented by one or a combination of one or more surrounding detecting sensors, such as image capturing devices e.g. cameras, radar, lidar, ultrasonics etc., and/or a positioning system, odometer, inertial measurement units etc.

Furthermore, identifying—at the ADS-equipped vehicle(s) 2 connected via the network 3—data indicative of one or more subscription options 5 defined in one or more smart contracts 6 on the blockchain, may be accomplished in any feasible manner, such as by said subscription options 5 being derivable from said blockchain and/or a transaction or block thereof. The smart contract(s) 6, on the other hand, deployed by the at least first service provider node 4, may be represented by any feasible arbitrary one or more smart contracts configured to define one or more subscription options 5. The blockchain-stored smart contract(s) described herein may follow general principles of smart contracts on blockchains as known in the art—which may involve programs and/or program code stored on the blockchain that for instance may run when predeterminable conditions are met, automate actions, and/or trigger next actions when conditions are met—however herein configured to control, trigger and/or assist in subscription-based activation of ADS features.

The one or more subscription options 5—or rather the data indicative thereof—may be distributed among the one or more smart contracts 6 in any arbitrary feasible manner; for instance, a single smart contract 6 may comprise one or several subscription options 5, and/or a subscription option 5 may be comprised in a single smart contract 6 and/or distributed over several thereof. Furthermore, the available subscription options 5 may be represented by any arbitrary number of options 5, e.g. ranging from a single subscription option 5 up to numerous thereof, and may potentially further respectively be restricted to specific geographical areas. The in respective subscription option 5 indicated ADS feature set available for activation, on the other hand, may comprise any arbitrary feasible one or more ADS features in any arbitrary feasible combination, e.g. ranging from a single ADS feature up to numerous thereof. Furthermore, the in respective subscription option 5 indicated required ADS-related vehicle configuration pertinent the corresponding ADS feature set, may be represented by any arbitrary feasible vehicle configurations relevant in view of said corresponding ADS feature set and/or a therewith associated ADS 21, for instance relating to hardware and/or software—and/or dynamic and/or static—vehicle configurations, such as required ADS-related and/or ADS-relevant equipment and/or sensors such as the exemplifying on-board sensors discussed above, supported ADS software versions, supported country registration, etc. That is, for an ADS feature to be able—and/or allowed—to be activated in a vehicle, said vehicle need to comply with various prerequisites, such as for instance comprising specific functioning sensor sets and/or equipment, running a certain ADS software version, being registered in a country in which activation is allowable etc., all of which may be representing the ADS-related vehicle configuration(s). Moreover, respective subscription option 5 may further comprise respective subscription time constraints—and/or data indicative of subscription time constraints—which may be of any arbitrary feasible temporal dimensions, for instance relating to a subscription start time, duration and/or end time, such as limiting a subscription to start and/or end at predeterminable point in time and/or have a predeterminable subscription period. Furthermore, optionally, respective subscription option 5 may further comprise respective subscription cost—and/or data indicative of subscription cost—associated with respective subscription option 5. Such an optional subscription cost may be of any arbitrary feasible amount, for instance associated with blockchain credits, and may further include zero and/or be empty, i.e. signaling no cost.

The phrase "identifying [ . . . ] data indicative of" may refer to "deriving, obtaining and/or reading [ . . . ] data indicative of", and according to an example further to "deriving, obtaining and/or reading from a blockchain of said network [ . . . ] data indicative of". Moreover, "one or more ADS-equipped vehicles connected via a peer-to-peer blockchain network" may refer to "one or more ADS-equipped vehicles configured to communicate via a peer-to-peer blockchain network", whereas "peer-to-peer blockchain network" may refer to "virtual, private and/or permissioned peer-to-peer blockchain network", "peer-to-peer distributed ledger technology, DLT, network" and/or merely "peer-to-peer network". "At one or more ADS-equipped vehicles", on the other hand, may refer to "at one or more ADS-equipped vehicle nodes", whereas "network further comprising [ . . . ]" may refer to "network further comprising [ . . . ] and potentially further non-vehicle nodes e.g. computational nodes". Furthermore, "service provider node dedicated to an ADS feature provider" may refer to "service provider node pertinent, associated with and/or controlled by an ADS feature provider and/or developer", whereas "service provider node" according to an example may refer to "non-vehicle service provider node". The phrase "data indicative of one or more subscription options", on the other hand, may refer to "data holding and/or revealing one or more subscription options" and/or merely "one or more subscription options", and further to "data indicative of one or more subscription alternatives, candidates and/or offers". Moreover, "subscription options comprising indication of various ADS feature sets" may refer to "subscription options comprising data indicative of various ADS feature sets" and/or merely "subscription options comprising various ADS feature sets", and further to "subscription options comprising indication of respective ADS feature sets". The phrase "ADS feature sets available for activation", on the other hand, may refer to "ADS feature sets offered for activation" and/or merely "ADS feature sets". Furthermore, "indication of respective corresponding required ADS-related vehicle configuration" may refer to "data indicative of respective corresponding required ADS-related vehicle configuration", "respective corresponding required ADS-related vehicle configuration", "indication of respective pertinent and/or relevant required ADS-related vehicle configuration", "indication of respective corresponding supported ADS-related vehicle configuration", "indication of respective corresponding required ADS-relevant vehicle configuration" and/or "indication of respective corresponding required vehicle configuration pertinent the ADS feature set and/or a therewith associated ADS", and according to an example further to "indication of respective corresponding required ADS-related vehicle configuration comprising and/or stipulating required ADS-related sensors and equipment" and/or "indication of respective corresponding required ADS-related vehicle configuration comprising and/or stipulating required—e.g. functioning and/or working— ADS-related sensors and equipment, potentially along with supported static configurations e.g. supported country registrations and/or supported ADS software versions". Moreover, "defined in [ . . . ] smart contract" may refer to "comprised, provided, available, included, stipulated and/or coded in [ . . . ] smart contract, whereas "smart contract deployed by said at least first service provider node" may refer to "smart contract distributed, provided, controlled and/or initiated by said at least first service provider node". Furthermore, "at least a first blockchain-stored smart contract" may throughout the disclosure refer to "one or more common and/or various blockchain-stored smart contracts", whereas "blockchain-stored smart contract" may refer to "predeterminable blockchain-stored smart contract", "smart contract on a blockchain of said network", "smart contract stored on a blockchain of said network" and/or "smart contract on the blockchain", and according to an example further to "blockchain-stored chaincode".

As illustrated in an exemplifying manner in exemplifying FIGS. 1 and 2, the distributed subscription-handling system 1 is further—e.g. by means of a transaction generating unit 102—adapted and/or configured for generating at a first vehicle 20 of the one or more vehicles 2, based on selecting one of the subscription options 5, a subscription request transaction 7 to be sent to the smart contract in which the selected subscription option 51 is defined, which subscription request transaction 7 comprises data indicative of the selected subscription option 51 and further vehicle identity—and/or status of ADS-related vehicle configuration—of the first vehicle 20. Thereby, at least a first vehicle 20 produces—with support from the selection-related smart contract(s)—a blockchain transaction candidate 7 indicative of a selected—e.g. by a potential vehicle occupant and/or customer associated with said first vehicle 20—subscription alternative 51, which further is indicative of an identity of the first vehicle 20—such as a vehicle identification number thereof—and/or of a ADS-relevant vehicle configuration of said first vehicle 20 reflecting a current and/or stored status and/or setup, such as e.g. one or more of ADS-related sensors and/or equipment and further functioning status thereof, ADS software version, country registration etc. Accordingly, following at least a first 51 of the subscription options 5 being picked—for instance based on selection input and/or selection data derivable and/or received from e.g. a user interface such as via a therefor configured app available in said first vehicle 20 and/or on an electronic device such as e.g. a smart phone associated with the first vehicle 20 and/or a customer in turn associated with said first vehicle 20—there is generated a record 7 comprising data reflecting the chosen subscription option 51 along with data reflecting the first vehicle's 20 identity—and/or status of its ADS-relevant configuration—to be added to the blockchain. Subsequently, numerous network-connected vehicles 2 may in a similar manner generate respective subscription request transactions, indicating respective selected subscription option(s).

Upon generating the subscription request transaction 7, a private key may—and most likely will—be used for signing of said transaction 7, as known in the art. Moreover, generating of a subscription transaction request 7 may occur at any arbitrary feasible time instant following a noted selection of a subscription option 5 such as essentially instantly thereafter, a predeterminable time thereafter and/or when circumstances—e.g. compute resources—so allow. The number of subscription request transactions 7 that may be generated, on the other hand, either per vehicle 20 and/or altogether for further network-connected vehicles 2, may similarly be arbitrary and range from a few up to thousands, millions or even more. Furthermore, the selected subscription option 51 comprised in the subscription request transaction 7 may comprise any arbitrary data derived from and/or based on the selection 51 made from the subscription options 5, such as at least a portion, subset and/or summary thereof. In a similar manner, the in the subscription request transaction 7 further comprised vehicle identity—and/or status of ADS-related vehicle configuration—of the first vehicle 20, may similarly comprise any arbitrary feasible data indicating the first vehicle's 20 ID and/or status of its ADS-relevant configuration, for instance derivable from prestored data. Furthermore, the ADS-related configuration and status thereof may refer to hardware and/or software—and/or dynamic and/or static—vehicle configuration relevant in view of the ADS 21 and/or the ADS feature set of the selected subscription option 51, for instance functioning, capability and/or working status— and further setup—of ADS-related and/or ADS-relevant equipment and/or sensors—such as the exemplifying on-board sensors discussed above—and potentially further ADS software version, country registration, etc. According to an example, the subscription request transaction 51 may further comprise data indicative of a desired subscription period—such as subscription start time, duration and/or end time—for instance gathered from and/or based on input and/or data derivable and/or received from the exemplifying user interface discussed above, for instance provided by said potential vehicle occupant and/or said customer associated with the first vehicle 20. Such an optional desired subscription period may be of any arbitrary feasible desired time constraints and/or temporal dimensions, for instance any feasible desired start and/or end time, and/or any feasible desired duration. Furthermore, optionally, the subscription request transaction 7 may further comprise blockchain credits—and/or data indicative of blockchain credits—to a value, or at least to a value, equal to a potential subscription cost of the selected subscription option 51.

The phrase "generating [ . . . ] a subscription request transaction" may refer to "initiating, creating and/or producing [ . . . ] a subscription request transaction", whereas "subscription request transaction" may refer to "subscription request record, entry and/or data". "Subscription request transaction to be sent to the smart contract", on the other hand, may refer to "subscription request transaction to be sent to the smart contract to be added to a blockchain on and/or distributed ledger of said network". Furthermore, "at a first vehicle" may refer to "at at least a first vehicle", whereas "based on selecting one of said subscription options" may refer to "based on derived and/or received selection input and/or data selecting one of said subscription options" and according to an example further to "based on derived and/or received selection input and/or data selecting one of said subscription options, said selection input and/or data further indicating a desired subscription period". The phrase "comprising data indicative of the selected subscription option", on the other hand, may refer to "comprising data reflecting the selected subscription option" and/or merely "comprising the selected subscription option", and according to an example further to "comprising data indicative of the selected subscription option and potentially desired subscription period". Moreover, the phrase "comprising [ . . . ] and further vehicle identity" may refer to "comprising [ . . . ] and further data indicative of vehicle identity", whereas "status of ADS-related vehicle configuration" may refer to "status and/or setup of ADS-related vehicle configuration", "status of ADS-relevant vehicle configuration" and/or "prestored and/or current status of ADS-related vehicle configuration", and according to an example further to "status of ADS-related vehicle configuration comprising functioning status of ADS-related vehicle sensors and/or equipment and potentially further comprising vehicle country registration".

As illustrated in an exemplifying manner in exemplifying FIGS. 1 and 2, the distributed subscription-handling system 1 is further—e.g. by means of a transaction adding unit 103—adapted and/or configured for adding with support from the selection-related smart contract 6 the subscription request transaction 7 to a blockchain of the network 3, when consensus of the subscription request transaction 7 is reached on the network 3. Thereby, upon consensus being reached among vehicles 2, service provider node(s) 4 and/or further nodes such as computational nodes on the network 3—for instance based on a proof-of-stake approach—the subscription request transaction 7 is logged—with support from the smart contract 6 in which the selected subscription option 51 is defined—to the blockchain. Accordingly, provided that consensus is reached on the network 3 for the subscription request transaction 7, such as by content of said transaction 7—e.g. at least the identity of the first vehicle 2 and/or the status of its ADS-related configuration—by for instance a majority of network-connected vehicles 2 and/or non-vehicle nodes, being found to comply with requirements and/or conditions stipulated in the smart contract 6 in which the selected subscription option 51 is defined—e.g. at least the required ADS-related vehicle configuration—then the subscription request transaction 7 is added to the blockchain.

The smart contract(s) 6 in which the selected subscription option 51 is defined—and which may be activated upon the subscription request transaction 7 being sent and/or provided as input thereto—may be configured in any arbitrary feasible manner for adding the subscription request transaction 7 to the blockchain. Moreover, with the use of smart contract(s) 6, data generated from said smart contract(s) 6 may—along with the subscription request transaction 7—additionally be added to the blockchain. The phrase "adding [ . . . ] the subscription request transaction" may refer to "logging [ . . . ] the subscription request transaction". Furthermore, "adding with support from the selection-related smart contract" may refer to "adding with support from the selection-related one or more contracts" and/or "adding with support from the smart contract and/or contracts in which the selected subscription option is defined", whereas "adding [ . . . ] to a blockchain" according to an example may refer to "adding [ . . . ] to a distributed ledger". Furthermore, according to an example, "adding with support from the selection-related smart contract the subscription request transaction to a blockchain of said network" may refer to "adding with support from the selection-related smart contract the subscription request transaction to a blockchain of said network, by sending and/or providing as input the subscription request transaction to said selection-related smart contract to thereby activate said selection-related smart contract". The phrase "when consensus [ . . . ] is reached", on the other hand, may refer to "upon and/or if consensus [ . . . ] is reached", whereas "consensus" may refer to "agreement", "approval" and/or "validation". Moreover, "reached on the network" may refer to "reached among vehicles, one or more of said at least first service provider node and/or further nodes on the network". According to an example, "when consensus of the subscription request transaction is reached on the network" may refer to "when consensus of the subscription request transaction is reached on the network, comprising and/or involving network-connected vehicles and/or non-vehicle nodes evaluating the possibility to active said selected subscription option".

Consensus on the network 3 may be reached in any arbitrary feasible—e.g. known—manner, such as based on a—e.g. known—proof-of-stake approach for instance using—e.g. known—consensus algorithm(s) which all—or essentially all—vehicles 2, service provider node(s) 4 and potentially other nodes on the network 3 may have the ability to run. Optionally, a prerequisite for reaching consensus on the network 3 may at least involve network-connected vehicles 2 and/or non-vehicle nodes—such as a majority thereof and/or to an extent stipulated by a proof-of-stake approach—respectively finding compliance between the required ADS-related vehicle configuration of the selected subscription option 51 and said status of the ADS-related vehicle configuration of the first vehicle 20 comprised in the subscription request transaction 7 or a—e.g. on the blockchain—prestored status of ADS-related vehicle configuration associated with the vehicle identity comprised in said subscription request transaction 7. Thereby, should a predeterminable and/or sufficient number and/or constellation of network-connected vehicles 2, service provider node(s) 4 and/or potentially other nodes on the network 3 not find compliance—and/or find non-compliance—in comparing said required ADS-related vehicle configuration and said status of the ADS-related vehicle configuration—and/or the prestored version of the ADS-related vehicle configuration tied to said vehicle identity—such as in terms of functional and/or working status of onboard ADS-related equipment and/or sensors, ADS software version, country registration etc, then consensus on the network will not be reached. Accordingly, in such a scenario, the generated subscription request transaction 7 may not be added to the blockchain, in that it is concluded that the first vehicle 20—for instance due to a currently determined and or prestored indication of a non-functioning ADS sensor rending said ADS sensor inadequate for the selected ADS feature set—does not support the requirement(s) of the selected subscription option 51.

For the case involving assessing and/or comparing the required ADS-related vehicle configuration to a prestored version of the status of the first vehicle's 2 ADS-related vehicle configuration, said prestored version may—from the provided identification of the first vehicle 20—be derivable in prestored data—such as a lookup table—in which identities of vehicles 2 on the network 3 are tied and/or stored in connection to respective vehicle's 2 status of ADS-related vehicle configuration. Said prestored data tying respective vehicle's 2 status of ADS-related vehicle configuration with corresponding vehicle identity may be—and/or have been—updated at any arbitrary feasible time instant or instants and/or at any arbitrary feasible time intervals. Said prestored data may furthermore be stored—and/or have been stored—in any arbitrary feasible manner, for instance locally. Optionally, the prestored status—i.e. the prestored status of the ADS-related configuration associated with the in the subscription request transaction 7 comprised vehicle identity—may be derivable from the blockchain—for instance as illustrated in exemplifying FIG. 1 from an optional configuration status transaction 8 thereof—with the prestored status being prestored on the blockchain with support from a blockchain-stored smart contract—e.g. deployed by one of the at least first service provider node 4—configured to—e.g. periodically—update associations between vehicle identities of network-connected vehicles 2 and their corresponding—e.g. current and/or read out—status of ADS-related vehicle configurations. Thereby, with the use of one or more such smart contracts, network-connected vehicles 2 may be triggered and/or requested to confirm and/or report their respective ADS-relevant vehicle configuration and status thereof—such as functional and/or working status of onboard ADS-related equipment and/or sensors, ADS software version, country registration etc.—which is then stored in association with corresponding vehicle's 2 vehicle identity—such as in a lookup table—on the blockchain, subsequently available to all—or essentially all—vehicles 2, service provider node(s) 4 and potential other nodes on the network 3. The optional smart contract(s) which may be used for updating and/or storing on the blockchain associations between vehicle identities of network-connected vehicles 2 and their corresponding status of ADS-related vehicle configurations, may—or may not—be part of and/or comprised in any of the previously discussed smart contract(s) 6 and/or may be based on the same or similar smart contract principles. Furthermore, said smart contract(s) may be configured to request the association updates at any arbitrary feasible time instant or instants and/or at any arbitrary feasible time intervals, such as daily.

Moreover, optionally, a prerequisite for reaching consensus on the network may further at least involves network-connected vehicles and/or non-vehicle nodes respectively further finding compliance between a subscription cost of the selected subscription option 51 and a value of blockchain credits further comprised in the subscription request transaction 7.

Thereby, should a predeterminable and/or sufficient number and/or constellation of network-connected vehicles 2, service provider node(s) 4 and/or potentially other nodes on the network 3 not find compliance—and/or find non-compliance—in comparing said required subscription cost and said value of blockchain credits included in the subscription request transaction 7, then consensus on the network will not be reached. Accordingly, in such a scenario, the generated subscription request transaction 7 may not be added to the blockchain, in that it is concluded that the first vehicle 20—for instance due to the included blockchain credits value being insufficient, non-existing and/or non-complying with the requested subscription cost—is not eligible and/or does not qualify for the selected subscription option 51.

As illustrated in an exemplifying manner in exemplifying FIGS. 1 and 2, the distributed subscription-handling system 1 is further—e.g. by means of an ADS feature enabling unit 104—adapted and/or configured for enabling at the first vehicle 20, based on identifying that the blockchain has been updated with the subscription request transaction 7, activation of at least a first ADS feature 210 corresponding to the ADS feature set of the selected subscription option 51. Thereby, upon establishing that the subscription request transaction 7 has been logged to the blockchain—and potentially further upon assessing data indicative of a therewith associated subscription status e.g. comprising indication of subscription period—the first vehicle 20 is then allowed activating one or more ADS features 210 complying with ADS feature(s) of the selected subscription option 51, for instance in accordance with conditions associated therewith such as subscription time constraints—e.g. allowed subscription period—and/or desired subscription period, and/or activation period(s). Accordingly, provided that said subscription request transaction 7 has been added to the blockchain, it may be concluded that restrictions and/or conditions pertinent the selected subscription option 51 are complied with and that the first vehicle 20 subsequently is deemed eligible and/or approved for implementing the selected subscription option 51.

In other words, with the introduced concept using a distributed mechanism based on smart contracts for handling feature subscription in vehicles 2, there is provided an approach which may limit and/or decrease process complexity of the backend and/or transaction costs of subscription handling, while at the same time limiting and/or decreasing number of handovers between potential different parties, such as an ADS feature provider, customer(s) and vehicle fleet OEM, and potentially further a subscription management system such as e.g. a billing B2B company. Moreover, the use of smart contracts in this context may further enable an ADS feature provider to retain control and transparency of the process such as current status and history—which otherwise would have been challenging to collect and maintain—while business and identity aspects of both the customer and of the ADS feature provider may remain protected. That is, as compared to an assumed standard centralized solution; with the introduced concept subscription and potential license handling is distributed to the vehicles, instead of subscriptions being handled centrally. This distributed approach covers not only the activation process and potential payment but also the validation of the vehicle configuration and identification, which—in addition to protecting private information between parties—significantly may decrease the number of handovers and process complexity of negotiating information between parties for activating a subscription in a customer vehicle.

Identifying that the blockchain has been updated with the subscription request transaction 7 may be accomplished in any arbitrary feasible manner, such as by the first vehicle 20 reading and/or deriving the same from the blockchain. Furthermore, enabling the at least first ADS feature 210 at the first vehicle 20 based thereon, may similarly be accomplished in any arbitrary feasible manner, such as by instructing—and/or communicating to—the onboard ADS software to allow said ADS feature(s) to be activated by the onboard ADS 21. The phrase "enabling [ . . . ] activation" may refer to "allowing, implementing and/or initiating [ . . . ] activation", and according to an example further to "enabling [ . . . ] activation potentially taking into consideration time constraints, such as subscription time constraints and/or desired subscription period". "Enabling [ . . . ] based on identifying that the blockchain has been updated with said subscription request transaction", on the other hand, may refer to "enabling [ . . . ] following and/or subsequent identifying that the blockchain has been updated with said subscription request transaction" and/or "enabling [ . . . ] based on deriving and/or reading that the blockchain has been updated with said subscription request transaction", and according to an example further to "enabling [ . . . ] based on identifying that the blockchain has been updated with said subscription request transaction and assessing data indicative of a therewith associated subscription status". Moreover, the phrase "ADS feature corresponding to the ADS feature set" may refer to "ADS feature complying and/or agreeing with the ADS feature set".

Optionally, and as illustrated in an exemplifying manner in exemplifying FIGS. 1 and 2, the distributed subscription-handling system 1 may further—e.g. by means of an optional ADS feature disabling unit 104—be adapted and/or configured for disabling at the first vehicle 20, activation of the at least first ADS feature 210 when determining that a subscription period of—and/or valid time constraints associated with—the selected subscription option 51 has expired and/or does not apply. Thereby, upon establishing that the selected subscription option 51 has come to an end and/or is no longer valid—and/or is currently not valid—activation of the one or more ADS features 210 may be disabled.

Determining that the subscription period has expired and/or currently does not apply, may be accomplished in any arbitrary feasible manner, such as by the ADS feature(s) 210 being disabled and/or inactivated based on a determining that a subscription period timer has expired and/or based on determining that a current point in time does not fulfil valid time constraints associated with the selected subscription option 51. This may for instance take place locally, e.g. off-chain, by the first vehicle 20. Optionally, however, said determining may be based on identifying at the first vehicle 20, that the blockchain has been updated with data indicative of that a subscription period of the selected subscription option 51 has expired and/or does not apply. Thereby, it may be derived from the blockchain—which for instance with support from a blockchain-stored smart contract e.g. deployed by one or the at least first service provider node 4 and further e.g. configured to periodically indicate and/or list expired subscriptions and/or subscriptions not valid e.g. in transactions such as in an exemplifying subscription alert transaction 9 illustrated in FIG. 1—whether and/or when that is the case for the selected subscription option 51. This represents a robust solution preventing in an efficient manner circumventing feature activation outside subscription periods. The optional smart contract(s) which may be used for updating and/or storing on the blockchain expired subscription options 5 and/or subscription options 5 that no longer apply, may—or may not—be part of and/or comprised in any of the previously discussed smart contract(s) 6 and/or may be based on the same or similar smart contract principles. Furthermore, said smart contract(s) may be configured to update—e.g. listings of—expired subscription options 5 and/or subscription options 5 that no longer apply at any arbitrary feasible time instant or instants and/or at any arbitrary feasible time intervals, such as daily. Moreover, identifying that the blockchain has been updated with data indicative of that a subscription period of the selected subscription option 51 has expired and/or does not apply, may be accomplished in any arbitrary feasible manner, such as by the first vehicle 20 reading and/or deriving the same from the blockchain. Furthermore, disabling activation of the at least first ADS feature 210 at the first vehicle 20 based thereon, may similarly be accomplished in any arbitrary feasible manner, such as by instructing—and/or communicating to—the onboard ADS software to disable said ADS feature(s) from being activated by the onboard ADS 21.

The phrase "disabling [ . . . ] activation of said at least first ADS feature" may refer to "enabling, allowing and/or initiating [ . . . ] inactivation of said at least first ADS feature" and/or "deactivating [ . . . ] said at least first ADS feature", whereas "when determining [ . . . ] expired and/or does not apply" may refer to "when determining [ . . . ] expired and/or currently does not apply", "upon, following and/or subsequent determining [ . . . ] expired and/or does not apply" and/or "when determining [ . . . ] come to an end and/or is not—or no longer—valid". Moreover, the phrase "subscription period of said selected subscription option" may refer to "valid time constraints of said selected subscription option" and/or "allowed and/or specified subscription period and/or desired subscription period associated with said selected subscription option". According to an example, the phrase "identifying [ . . . ] that the blockchain has been updated with data" may refer to "identifying [ . . . ], with support from a blockchain-stored smart contract—e.g. configured to indicate expired subscription and/or subscriptions that do not apply—deployed by one or more of said at least first service provider node, that the blockchain has been updated with data" and/or "identifying [ . . . ] that the blockchain has been updated with a subscription alert transaction comprising data".

As previously discussed, the subscription options 5 may optionally further comprise a respective subscription cost associated with respective subscription option 5, and the subscription request transaction 7 further comprise blockchain credits at least to a value equal to the subscription cost of the selected subscription option 51. Optionally, and as illustrated in an exemplifying manner in exemplifying FIGS. 1 and 2, the distributed subscription-handling system 1 may then further—e.g. by means of an optional credits enabling unit 105—be adapted and/or configured for enabling, based on identifying that the blockchain has been updated with the subscription request transaction 7, release of blockchain credits 30 to a value equal to the value comprised in the subscription request transaction 7, from a service-receiving account 200 tied to the first vehicle 20 and/or a customer associated with the first vehicle 20, to a service-providing account 40 tied to the ADS feature provider. Thereby, controlled by the smart contract(s) 6, a token transaction may take place paying for the selected subscription option 51, in that a blockchain account of the ADS feature provider, i.e. a service-providing account 40, receives subscription credits 30 from an account of the customer, i.e. a service-receiving account 200. The credit 30 may be used off-chain by moving e.g. fiat currency from an escrow account to the service-providing account 40 at the same time as those credits 30 are removed from the blockchain, which realizes translation of the subscription payment on the blockchain into fiat currency. That is, an escrow account may keep fiat currency that backs the blockchain credits used as payment for the service, in this case the selected subscription option 51 and/or costs associated therewith. The blockchain credit transfers may be executed in fiat currency off-chain from the escrow account from the customer, to the ADS feature provider and potentially back to the customer as a refund of paid money. For instance, a customer buys or leases a vehicle 2 from the OEM. An up-front payment is completed, and the vehicle 2 is delivered. When the OEM receives the payment, part of that money is paid into an escrow account owned by the ADS feature provider to cover initial and future feature subscriptions included in the vehicle delivery. This money may be used as backing for newly created blockchain credits that are moved into the customer's blockchain account, i.e. service-receiving account 200. The customer may have a unique pair of private and public keys that ties that particular person to this account 200 on the blockchain, and may further have the ability to add more money to the escrow account to add credits to his or her blockchain account 200. It would also be possible to set up this flow with a e.g. monthly subscription that not necessarily takes an up-front payment from the customer, but rather automatically push money into escrow and execute automatic prolonging of subscription.

The phrase "said subscription options further comprise a respective subscription cost" may refer to "said subscription options further comprise data indicative of a respective subscription cost", whereas "enabling based on identifying that the blockchain has been updated" may refer to "enabling following and/or subsequent identifying that the blockchain has been updated". "Subscription request transaction further comprising blockchain credits", on the other hand, may refer to "subscription request transaction further comprising data indicative of blockchain credits". Furthermore, "enabling [ . . . ] release" may refer to "enabling [ . . . ] transaction" and/or "enabling off-chain [ . . . ] release", whereas "release of blockchain credits to a value" may refer to "release of blockchain credits at least to a value". The phrase "service-receiving account tied to said vehicle and/or a customer associated with said first vehicle", on the other hand, may refer to "service-receiving account associated with said vehicle and/or a customer associated with said first vehicle", whereas "service-providing account tied to said ADS feature provider" in a similar manner may refer to "service-provider associate with said ADS feature provided".

As further shown in FIG. 2, the distributed subscription-handling system 1 comprises an options identifying unit 101, a transaction generating unit 102, a transaction adding unit 103, an ADS feature enabling unit 104, an optional ADS feature disabling unit 105 and an optional credits enabling unit 106, all of which already have been described in greater detail above. Furthermore, the embodiments herein for supporting subscription-based activation of ADS features in a vehicle, may be implemented through one or more processors, such as processor 107, for instance represented by one or more Central Processing Units, CPUs, and/or one or more Graphics Processing Units, GPUs, together with computer program code for performing the functions and actions of the embodiments herein. Said program code may also be provided as one or more computer program products, for instance in the form of one or more data carriers carrying computer program code for performing the embodiments herein when being loaded into the distributed subscription-handling system 1. One such carrier may be in the form of a CD/DVD ROM disc and/or a hard drive, it is however feasible with other data carriers. The computer program code may furthermore be provided as pure program code on a server and downloaded to the distributed subscription-handling system 1. The distributed subscription-handling system 1 may further comprise one or more memories 108 comprising one or more memory units. The one or more memories 108 optionally includes high-speed random access memory, such as DRAM, SRAM, DDR RAM, or other random access solid-state memory devices, and further optionally include non-volatile memory, such as one or more magnetic disk storage devices, optical disk storage devices, flash memory devices, or other non-volatile solid-state storage devices. Moreover, the one or more memories 108 may be arranged to be used to store e.g. information, and further to store data, configurations, scheduling, and applications, to perform the methods herein when being executed in the distributed subscription-handling system 1. For instance, the computer program code may be implemented in the firmware, stored in one or more FLASH memories 108, of one or more embedded processors 107, and/or downloaded wirelessly e.g. from an off-board server. Furthermore, the units 101-106 described above, the optional processor(s) 107 and/or the optional one or more memories 108, may at least partly be comprised in one or more nodes e.g. ECUs of respective network-connected vehicle 2, e.g. in and/or in association with respective ADS 21, and or in one or more nodes on the network 3, such as a service provider node 4 and/or computational node. Those skilled in the art will also appreciate that said units 101-106 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in one or more memories such as the one or more memories 108, that when executed by the one or more processors such as the processor(s) 107 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
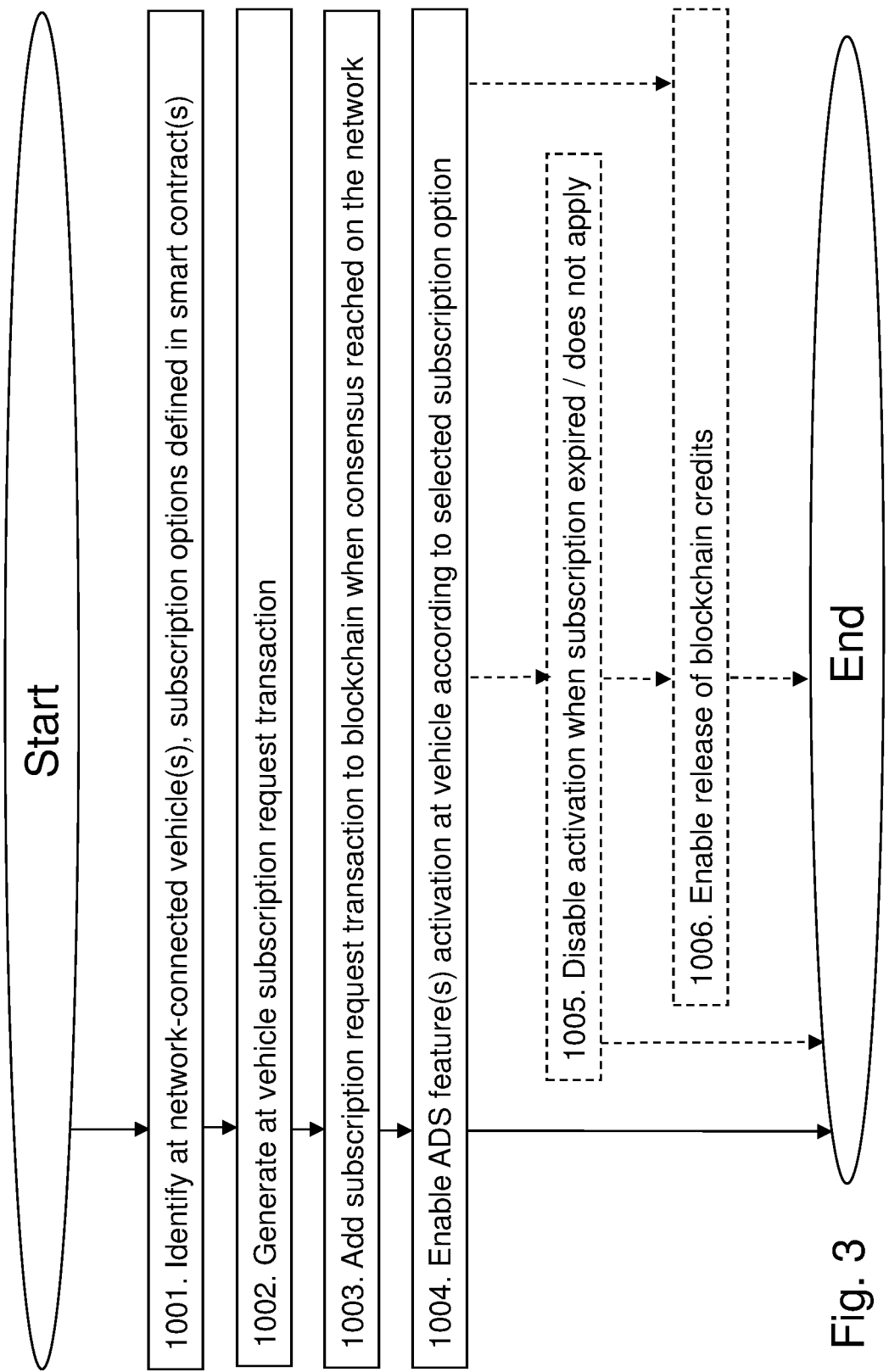
FIG. 3 is a flowchart depicting an exemplifying method performed by a distributed subscription-handling system according to embodiments of the disclosure.

FIG. 3 is a flowchart depicting an exemplifying method performed by a distributed subscription-handling system 1 according to embodiments of the disclosure. Said method is for supporting subscription-based activation of ADS features in a vehicle. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Action 1004 and optional Action 1006 may be performed essentially simultaneously and/or in alternate order.

Action 1001

In Action 1001, the distributed subscription-handling system 1 identifies—e.g. with support from the options identifying unit 101—at one or more ADS-equipped vehicles 2 connected via a peer-to-peer blockchain network 3 further comprising at least a first service provider node 4 dedicated to an ADS feature provider, data indicative of one or more subscription options 5 comprising indication of various ADS feature sets available for activation and indication of respective corresponding required ADS-related vehicle configuration, defined in at least a first blockchain-stored smart contract 6 deployed by the at least first service provider node 4.

Optionally, the subscription options 5 may further comprise a respective subscription cost associated with respective subscription option 5.

Action 1002

In Action 1002, the distributed subscription-handling system 1 generates—e.g. with support from the transaction generating unit 102—at a first vehicle 20 of the one or more vehicles 2, based on selecting one of the subscription options 5, a subscription request transaction 7 to be sent to the smart contract 6 in which the selected subscription option 51 is defined, which subscription request transaction 7 comprises data indicative of the selected subscription option 51 and further vehicle identity—and/or status of ADS-related vehicle configuration—of the first vehicle 20.

Optionally, Action 1002 of generating a subscription request transaction 7 may comprise the subscription request transaction 7 further comprising blockchain credits at least to a value equal to the subscription cost of the selected subscription option 51.

Action 1003

In Action 1003, the distributed subscription-handling system 1 adds—e.g. with support from the transaction adding unit 103—with support from the selection-related smart contract 6, the subscription request transaction 7 to a blockchain of the network 3, when consensus of the subscription request transaction 7 is reached on the network 3.

Optionally, a prerequisite for reaching consensus on the network 3 may at least involve network-connected vehicles 2 and/or non-vehicle nodes respectively finding compliance between the required ADS-related vehicle configuration of the selected subscription option 51 and said status of ADS-related vehicle configuration or a, e.g. on the blockchain, prestored status of ADS-related vehicle configuration associated with said vehicle identity.

Further optionally, a prerequisite for reaching consensus on the network 3 may potentially further at least involve network-connected vehicles 2 and/or non-vehicle nodes respectively finding compliance between a subscription cost of the selected subscription option 51 and a value of blockchain credits further comprised in the subscription request transaction 7.

Moreover, optionally, the optional prestored status of ADS-related vehicle configuration associated with said vehicle identity may be derivable from the blockchain, which prestored status is prestored on the blockchain with support from a blockchain-stored smart contract configured to update associations between vehicle identities of network-connected vehicles 2 and their corresponding status of ADS-related vehicle configurations.

Action 1004

In Action 1004, the distributed subscription-handling system 1 enables—e.g. with support from the ADS feature enabling unit 104—at the first vehicle 20, based on identifying that the blockchain has been updated with the subscription request transaction 7, activation of at least a first ADS feature 210 corresponding to the ADS feature set of the selected subscription option 51.

Action 1005

In optional Action 1005, the distributed subscription-handling system 1 may disable—e.g. with support from the optional ADS feature disabling unit 105—at the first vehicle 20, activation of the at least first ADS feature 210 when determining that a subscription period of the selected subscription option 51 has expired and/or does not apply.

Optionally, Action 1005 of disabling activation may comprise that the determining that a subscription period of the selected subscription option 51 has expired and/or does not apply, is based on identifying at the first vehicle 20 that the blockchain has been updated with data indicative of that a subscription period of the selected subscription option 51 has expired and/or does not apply.

Action 1006

In optional Action 1006, the distributed subscription-handling system 1 may enable—e.g. with support from the optional credits enabling unit 106—based on identifying that the blockchain has been updated with the subscription request transaction 7, release of blockchain credits 30 to a value equal to the value comprised in the subscription request transaction 7, from a service-receiving account 200 tied to the first vehicle 20 and/or a customer associated with the first vehicle 20, to a service-providing account 40 tied to the ADS feature provider.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a distributed subscription-handling system for supporting subscription-based activation of automated driving system, ADS, features in a vehicle, the method comprising:

identifying at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node;

generating at a first vehicle of the one or more vehicles, based on selecting one of the subscription options, a subscription request transaction to be sent to the smart contract in which the selected subscription option is defined, the subscription request transaction comprising data indicative of the selected subscription option, and at least one of further vehicle identity and status of ADS-related vehicle configuration, of the first vehicle; adding with support from the selection-related smart contract the subscription request transaction to a blockchain of the network, when consensus of the subscription request transaction is reached on the network; and enabling at the first vehicle, based on identifying that the blockchain has been updated with the subscription request transaction, activation of at least a first ADS feature corresponding to the ADS feature set of the selected subscription option.

2. The method according to claim 1, further comprising: disabling at the first vehicle, activation of the at least first ADS feature when determining that a subscription period of the selected subscription option at least one of has expired and does not apply.

3. The method according to claim 2, wherein a prerequisite for reaching consensus on the network at least involves at least one of network-connected vehicles and non-vehicle nodes respectively finding compliance between:
the required ADS-related vehicle configuration of the selected subscription option and the status of ADS-related vehicle configuration or, on the blockchain, a prestored status of ADS-related vehicle configuration associated with the vehicle identity.

4. The method according to claim 2, wherein the determining is based on identifying at the first vehicle that the blockchain has been updated with data indicative that the subscription period of the selected subscription option at least one of has expired and does not apply.

5. The method according to claim 4, wherein a prerequisite for reaching consensus on the network at least involves at least one of network-connected vehicles and non-vehicle nodes respectively finding compliance between:
the required ADS-related vehicle configuration of the selected subscription option and the status of ADS-related vehicle configuration or, on the blockchain, a prestored status of ADS-related vehicle configuration associated with the vehicle identity.

6. The method according to claim 2, wherein the subscription options further comprise a respective subscription cost associated with respective subscription option, the generating then comprising the subscription request transaction further comprising blockchain credits at least to a value equal to the subscription cost of the selected subscription option, the method further comprising:
enabling based on identifying that the blockchain has been updated with the subscription request transaction, release of blockchain credits to a value equal to the value comprised in the subscription request transaction, from a service-receiving account tied to at least one of the first vehicle and a customer associated with the first vehicle, to a service-providing account tied to the ADS feature provider.

7. The method according to claim 1, wherein a prerequisite for reaching consensus on the network at least involves at least one of network-connected vehicles and non-vehicle nodes respectively finding compliance between:
the required ADS-related vehicle configuration of the selected subscription option and the status of ADS-related vehicle configuration or, on the blockchain, a prestored status of ADS-related vehicle configuration associated with the vehicle identity.

8. The method according to claim 7, wherein the prestored status is derivable from the blockchain, the prestored status being prestored on the blockchain with support from a blockchain-stored smart contract configured to update associations between vehicle identities of network-connected vehicles and their corresponding status of ADS-related vehicle configurations.

9. The method according to claim 7, further comprising finding compliance between a subscription cost of the selected subscription option and a value of blockchain credits further comprised in the subscription request transaction.

10. The method according to claim 1, wherein the subscription options further comprise a respective subscription cost associated with respective subscription option, the generating then comprising the subscription request transaction further comprising blockchain credits at least to a value equal to the subscription cost of the selected subscription option, the method further comprising:
enabling based on identifying that the blockchain has been updated with the subscription request transaction, release of blockchain credits to a value equal to the value comprised in the subscription request transaction, from a service-receiving account tied to at least one of the first vehicle and a customer associated with the first vehicle, to a service-providing account tied to the ADS feature provider.

11. A distributed subscription-handling system for supporting subscription-based activation of automated driving system, ADS, features in a vehicle, the distributed subscription-handling system comprising:
an options identifying unit configured to identify at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node;
a transaction generating unit configured to generate at a first vehicle of the one or more vehicles, based on selecting one of the subscription options, a subscription request transaction to be sent to the smart contract in which the selected subscription option is defined, the subscription request transaction comprising data indicative of the selected subscription option, and at least one of further vehicle identity and status of ADS-related vehicle configuration, of the first vehicle;
a transaction adding unit configured to add with support from the selection-related smart contract the subscription request transaction to a blockchain of the network, when consensus of the subscription request transaction is reached on the network; and
an ADS feature enabling unit configured to enable at the first vehicle, based on identifying that the blockchain has been updated with the subscription request transaction, activation of at least a first ADS feature corresponding to the ADS feature set of the selected subscription option.

12. The distributed subscription-handling system according to claim 11, further comprising:
an ADS feature disabling unit configured to disable at the first vehicle, activation of the at least first ADS feature when determining that a subscription period of the selected subscription option at least one of has expired and does not apply.

13. The distributed subscription-handling system according to claim 12, wherein the ADS feature disabling unit is adapted such that the determining is based on identifying at the first vehicle that the blockchain has been updated with data indicative that the subscription period of the selected subscription option at least one of has expired and does not apply.

14. The distributed subscription-handling system according to claim 11, wherein a prerequisite for reaching consensus on the network at least involves at least one of network-connected vehicles and non-vehicle nodes respectively finding compliance between:
the required ADS-related vehicle configuration of the selected subscription option and the status of ADS-related vehicle configuration or, on the blockchain, a prestored status of ADS-related vehicle configuration associated with the vehicle identity.

15. The distributed subscription-handling system according to claim 14, wherein the prestored status is derivable from the blockchain, the prestored status being prestored on the blockchain with support from a blockchain-stored smart contract configured to update associations between vehicle identities of network-connected vehicles and their corresponding status of ADS-related vehicle configurations.

16. The distributed subscription-handling system according to claim 14, further comprising finding compliance between a subscription cost of the selected subscription option and a value of blockchain credits further comprised in the subscription request transaction.

17. The distributed subscription-handling system according to claim 11, wherein the subscription options further comprise a respective subscription cost associated with respective subscription option, the transaction generating unit then being adapted for the subscription request transaction further comprising blockchain credits at least to a value equal to the subscription cost of the selected subscription option, the distributed subscription-handling system further comprising:
a credits enabling unit for enabling based on identifying that the blockchain has been updated with the subscription request transaction, release of blockchain credits to a value equal to the value comprised in the subscription request transaction, from a service-receiving account tied to at least one of the first vehicle and a customer associated with the first vehicle, to a service-providing account tied to the ADS feature provider.

18. The distributed subscription-handling system according to claim 11, wherein the distributed handling system is comprised in a network-connected ADS-equipped vehicle.

19. The distributed subscription-handling system according to claim 11, wherein the distributed handling system is comprised in a network-connected non-vehicle node.

20. A non-transitory computer storage medium storing a computer program that when executed causes one of a computer and a processor to perform a method for supporting subscription-based activation of automated driving system, ADS, features in a vehicle, the method comprising:
identifying at one or more ADS-equipped vehicles connected via a peer-to-peer blockchain network further comprising at least a first service provider node dedicated to an ADS feature provider, data indicative of one or more subscription options comprising indication of various ADS feature sets available for activation and indication of respective corresponding required ADS-related vehicle configuration, defined in at least a first blockchain-stored smart contract deployed by the at least first service provider node;
generating at a first vehicle of the one or more vehicles, based on selecting one of the subscription options, a subscription request transaction to be sent to the smart contract in which the selected subscription option is defined, the subscription request transaction comprising data indicative of the selected subscription option, and at least one of further vehicle identity and status of ADS-related vehicle configuration, of the first vehicle;
adding with support from the selection-related smart contract the subscription request transaction to a blockchain of the network, when consensus of the subscription request transaction is reached on the network; and
enabling at the first vehicle, based on identifying that the blockchain has been updated with the subscription request transaction, activation of at least a first ADS feature corresponding to the ADS feature set of the selected subscription option.

* * * * *